Figure 1:
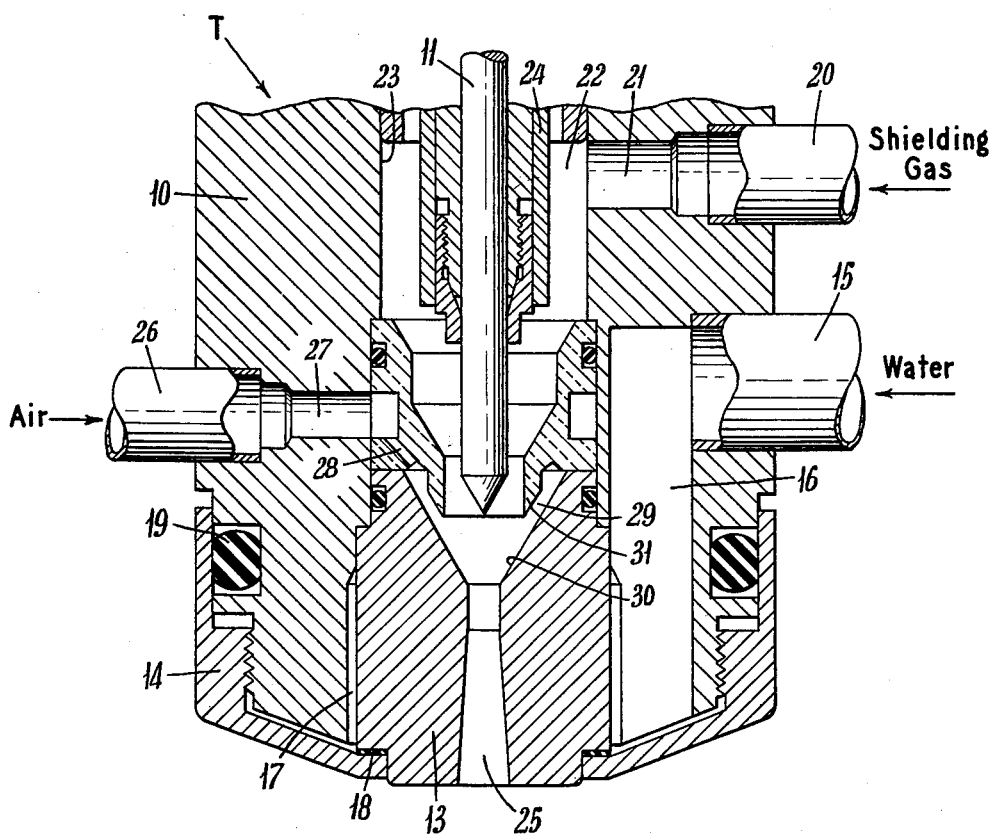

Feb. 12, 1963   R. M. GAGE ET AL   3,077,108
SUPERSONIC HOT GAS STREAM GENERATING APPARATUS AND METHOD
Filed Feb. 20, 1958   3 Sheets-Sheet 1

INVENTORS
ROBERT M. GAGE
THOMAS B. REED
RICHARD C. ESCHENBACH
BY Barnwell R. King
ATTORNEY

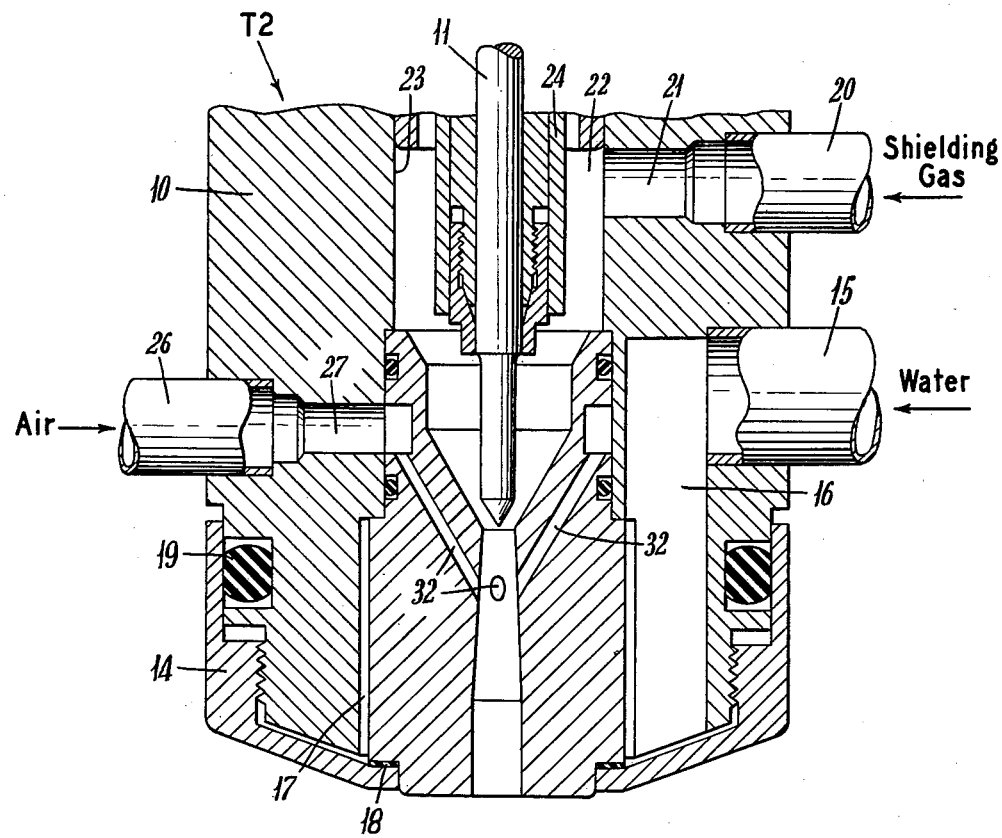

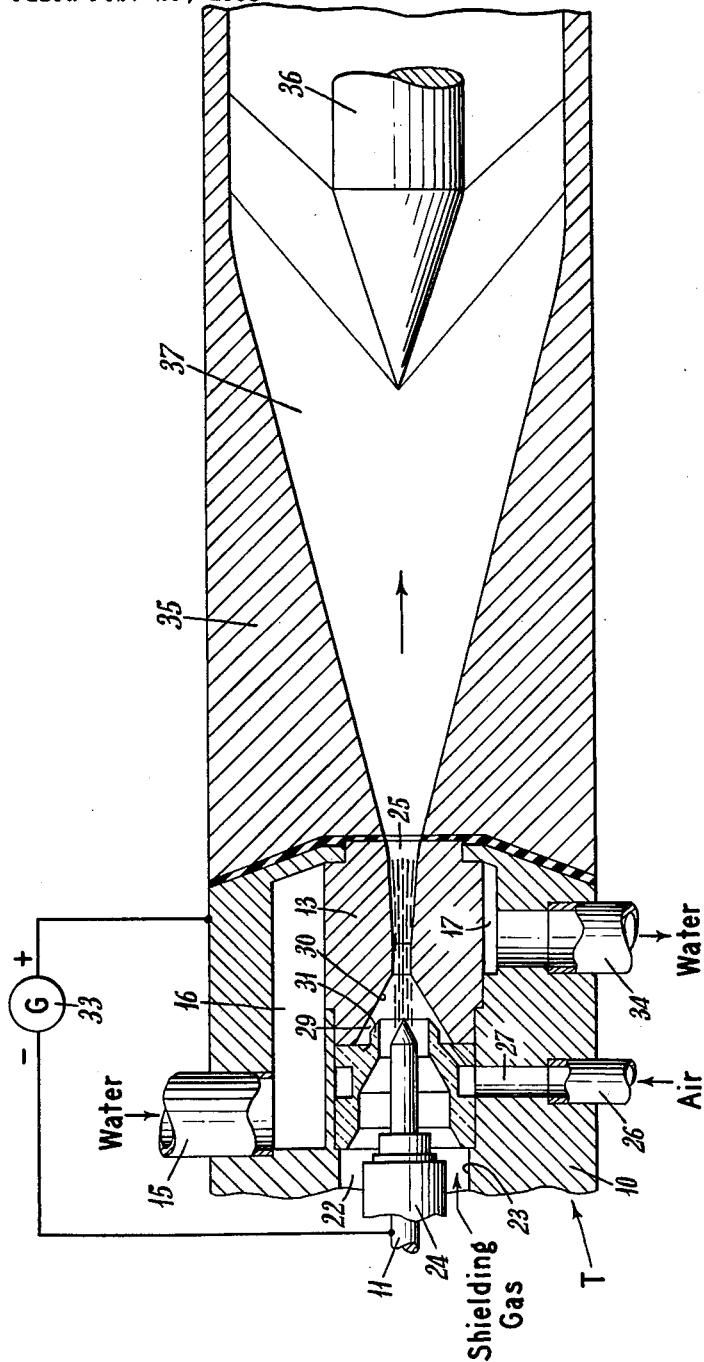

United States Patent Office 3,077,108
Patented Feb. 12, 1963

3,077,108
SUPERSONIC HOT GAS STREAM GENERATING APPARATUS AND METHOD
Robert M. Gage, Indianapolis, Thomas B. Reed, Danville, and Richard C. Eschenbach, Indianapolis, Ind., assignors to Union Carbide Corporation, a corporation of New York
Filed Feb. 20, 1958, Ser. No. 716,323
9 Claims. (Cl. 73—147)

This invention relates to the testing of missile materials in an air stream simulating actual conditions of temperature and velocity likely to be met by such materials in flight through the earth's atmosphere and stratosphere.

According to the invention there is provided a novel testing process and apparatus in which test pieces are subjected to a very stable, high temperature, high velocity stream of selected gas. Such stream is generated by a novel non-transferred (work-out-of-circuit) high-pressure arc torch having an axially elongated divergent nozzle from which a high temperature gas effluent is axially discharged at high velocity. The material to be tested is positioned in such effluent which simulates in temperature and flow the conditions to which such material might be subjected in actual use.

A pressing demand presently exists in the aircraft and missile industry for ways and means to test actual components or scale models of missile equipment under simulated operating conditions. The test conditions are severe in that air streams, for example, at 12,000 ft./sec. and 5000° K. (approximately Mach 12) and at 18,000 ft./sec. and 300° K. (approximately Mach 18) are required.

An electric arc at present appears to be the most practical heat source for supplying energy required for achieving such severe conditions. A prior art device proposed for producing a high temperature, high velocity air stream involved a chamber in which an arc was struck between a carbon stick electrode and a carbon nozzle electrode at an outlet of such chamber. Air entered the chamber tangentially, then whirled around the chamber and out through the nozzle electrode. Such device had the primary disadvantages of undesirable contamination of the effluent air stream by the consumable carbon electrodes and rotational flow of the effluent gas stream.

An additional disadvantage of prior art devices was their relatively short useful life. Since the electrodes were consumable, after as little operating time as a minute, the equipment was eroded to such an extent as to be inoperative. Complex and expensive mechanisms for feeding consumable electrodes and maintaining a fairly constant arc length were also required. Also, due to erosion of the electrodes, the flow characteristics of the air stream through the torch and into the effluent stream were constantly changing, leading to erratic test results.

In considering how such problems might be overcome by the apparatus disclosed by Robert M. Gage in copending application, Serial No. 666,160, filed June 17, 1957, now Patent No. 2,862,099, it is noted that such apparatus comprises a non-consumable stick electrode and a cooled non-consumable nozzle electrode. An arc is struck between such electrodes and an air stream passes through the arc and out of the nozzle orifice. The gas flow and nozzle orifice dimensions are such as to force part or all of the arc down into the nozzle, thus resulting in a partially wall-stabilized arc. The stick electrode that is preferably composed of tungsten containing emissive material, such as thoria, is protected from damage from air oxidation by a separate surrounding shielding gas stream. Such shielding gas stream also protects the cathode from mechanical erosion caused by the hot air stream. Such apparatus, however, has a disadvantage when used for producing a high temperature, high velocity air stream required for testing missile components. That disadvantage in the present operation is the somewhat limited useful life caused by nozzle electrode oxidation, erosion and pitting.

The present invention overcomes the disadvantages described above by discharging the stream through a non-consumable nozzle having a divergent orifice that is the electrode of a non-transferred high-pressure arc, the axial length of such orifice being at least six times the throat diameter thereof, and the average wall-divergence included angle thereof being less than 30 degrees, whereby the arc is kept within such orifice. The resultant equipment unexpectedly stands up to severe oxidation and arc erosion conditions for relatively long periods of time without severe damage.

Apparatus incorporating the invention has been successfully operated with air at electrical power inputs up to about 40 kilowatts for extended periods of time with substantially no contamination of the hot, high velocity air effluent and with substantially no anode damage. It is a major improvement over prior devices in this regard.

In the drawings:
FIG. 1 is a fragmentary longitudinal cross-sectional view of a wind generator illustrating the invention;
FIG. 2 is a similar view of a modification; and
FIG. 3 is a fragmentary view in longitudinal sections of a wind tunnel schematically illustrating one example of the invention.

As shown in FIG. 1 the device T consists of a torch body 10, an inner stick cathode 11, preferably made of refractory material such as thoriated tungsten, and a replaceable non-consumable nozzle anode 13, preferably made of metal such as copper. Other nozzle materials such as silver, tungsten and aluminum can also be used if desired. The nozzle is held in position by retaining sleeve 14. Cooling water enters through inlet 15 and conduit 16, passes through annulus 17 and then exits from the torch through an outlet (not shown). Leakage of cooling water is prevented by a washer 18 and O-ring 19.

Shielding gas such as argon under pressure enters through inlet 20 and conduit 21, passes down through annulus 22 between boring 23 in torch body 10 and electrode support member 24, then passes around the tip of cathode 11 and out through divergent orifice 25 in the nozzle anode 13.

Air under pressure enters through inlet 26 and conduit 27, passes through conduits 28, then down through an annular space 29 between conical inlet boring 30 in nozzle electrode 13 and a shielding barrier 31 in the form of a cup, the gas exit rim of which extends at least to the tip of the cathode to insure complete protection of the latter. Shielding barrier 31 is preferably water-cooled metal which is also electrically insulated from electrodes 11 and 13. The air then mixes with the shielding gas and passes through divergent orifice 25. The included angle of wall divergence of this passage should be less than about 30° and preferably about 5° to 10°. Orifice 25 is made sufficiently long, i.e., at least six times the throat diameter, so that the arc from electrode 11 terminates well within the nozzle orifice for particular operating conditions.

The current distribution along a nozzle anode surface is longitudinally extended. The use of a nozzle anode which is too short for a given arc results in the concentration at the end of the nozzle of the current which would normally terminate at a point beyond the end thus creating severe arc pitting. At the present time and under present conditions of gas flow and power input according to the invention, nozzle electrodes are being used which are about 1 to 2 inches long with a nozzle throat ⅛-inch in diameter and a nozzle outlet 3/16-inch in diameter. Nozzle erosion was substantially increased when nozzles having an orifice axial length only ¾-inch long were used under similar operating conditions.

In operation, an electrical power source (not shown) is connected between stick cathode 11 and nozzle anode 13, and the arc is conveniently initiated by pushing electrode 11 down into arcing relation to nozzle electrode 13, then retracting it to the desired operating position.

An arc of 160 volts (DCSP) and 260 amperes (41.6 kw.) was maintained between a ⅛-inch diameter thoriated tungsten stick electrode and a nozzle electrode having a divergent orifice expanding from ⅛-inch diameter to a 3/16-inch diameter outlet. The nozzle electrode had an outer diameter of one inch. Argon shielding gas at 54 c.f.h. and 332 c.f.h. air passed separately into the apparatus and then mixed while passing out through the nozzle electrode orifice.

The hot air effluent discharging from a chamber pressure of 73 p.s.i.g. through the nozzle had a calculated exit velocity of 6200 f.p.s. which is approximately Mach 1.6 for those conditions. This torch was operated at substantially the above indicated power input for 13 minutes at which time the run was terminated. Examination of the equipment indicated only a slight amount of nozzle electrode erosion. This apparatus could have been operated at such power levels for a considerable extended period of time to produce an uncontaminated high velocity hot air jet.

In FIG. 2 the apparatus T2 is generally the same as that of FIG. 1 with the exception of the means for injecting the air stream. Conduits 32 enter the nozzle orifice passage 25 downstream from the nozzle inlet.

The material or body to be tested is located at X in the air arc or plasma that is discharged from the device. Testing is thereby accomplished under conditions that closely simulate conditions of actual flight of such body or material.

FIG. 3 illustrates a wind tunnel for testing missile components which utilizes the present invention for providing the desirable high temperature, high velocity air stream. An arc is struck between cathode 11 and anode 13 which is powered by electrical D.C. supply 33. An inert gas stream flows around cathode 11 and an air stream is introduced at conduit 26. Cooling water enters through pipe 16, passes through annulus 17 and leaves through outlet 34. The hot air effluent from the divergent nozzle passage enters a wind tunnel defined by wall 35. A test model 36 is located within the internal wind tunnel passage 37. A pump (not shown) located downstream of the test piece removes the gas from the test area and also reduces the pressure in the test area when necessary to obtain hypersonic velocities.

The precise reason why the nozzle anode of the invention can stand up for substantially longer periods of time than those of the prior art is not known to us. However, the following discussion is an attempt at an explanation without limiting the invention to this theory.

In comparing a cylindrical nozzle with a divergent nozzle the latter has a greater internal surface area for a given length. Therefore, the anode surface available for carrying arc current is increased allowing a lower current density per unit area. This decreases arc pitting. Likewise, it enables greater total arc current values to be used at the same anode current density than with cylindrical nozzles. A streamlined design of a divergent nozzle orifice conforms closely to the flow of the expanding arc-gas stream. In this fashion there is decreased turbulence along the nozzle wall, allowing the cooler gas next to the anode to protect it from oxidation, erosion and pitting. Use of a divergent nozzle reduces the nozzle pressure as compared with a cylindrical or convergent nozzle. The arc voltage gradient in an expanded nozzle is decreased, tending to increase the arc length for a given voltage, and also to spread the anode heating caused by electron condensation over a greater surface area thus tending to prevent hot spots along the anode nozzle wall.

Since this apparatus is intended primarily to operate at supersonic (Mach 1–10) and hypersonic (Mach 10 and above) velocities in the outlet air effluent, a divergent passage helps to achieve such velocities. The gas pressure at the inlet to the nozzle electrode is maintained above 30 p.s.i.a. and usually above 75 p.s.i.a. when the torch discharges to the atmosphere.

The separate inert gas stream used to shield the inner stick electrode from air oxidation is not a serious contaminant in the air effluent, because it is usually chemically inert and is present in small quantities. In any event, the gross effluent can, if desired, be made exactly of air composition merely by adjusting the total oxgyen, nitrogen and argon passing through the torch.

Another feature of the present invention which enables it to operate more successfully than prior art devices is the particular nozzle configuration with respect to size. Prior devices using nozzle electrodes have maintained relatively thin nozzle walls in an attempt to increase heat transfer rate from nozzle inner passage wall to surrounding cooling medium. This has not been a completely successful solution to nozzle damage caused by hot spots.

The present invention utilizes nozzle electrodes having a high ratio of outer diameter to minimum inner diameter. This ratio varies from about 20 for 1/16-inch diameter nozzles to about 4 for ½-inch diameter nozzles composed of high thermal conductivity materials such as copper and tungsten. The water cooling passage surrounding the nozzle outer surface is also made relatively thin in order to increase the velocity of the cooling medium in direct contact with the nozzle electrode. This apparatus is capable of operating at higher power input for given torch size than are prior art devices.

While air and argon gas are given above by way of example it, will be understood that other reactive gases such as $CO_2$ and oxygen may be used in admixture with or in place of air, and other inert gas such as helium, hydrogen, krypton, neon, nitrogen, xenon, and mixtures thereof may be used in admixture with or in place of argon. Also, the latter may be used in admixture with or in place of air without departing from the basic concept of the invention.

What is claimed is:

1. A wind generator comprising a high-pressure arc torch provided with a central cathode, means for protecting the arc end of said cathode with a stream of inert gas, an anode in the form of a nozzle surrounding said cathode in spaced relation to provide a wind gas passage leading to the outlet of said nozzle, said outlet having a divergent conical inner wall for the expansion of gas discharged therefrom to provide a test wind, means for establishing a high-pressure arc between said cathode and anode to heat such wind, and means for supplying gas to said gas passage at a pressure sufficient to discharge the resulting arc plasma from said outlet at a wind velocity of at least Mach 1.

2. A wind generator comprising an anode nozzle having a conical divergent arc gas outlet passage, a cathode stick electrode centrally mounted within such anode nozzle, means for protecting said cathode from oxidation and erosion, means for supplying air to such anode nozzle for discharge therefrom through such divergent arc gas outlet passage, and means for ionizing such gas in such nozzle comprising means for energizing a high-pressure arc between said stick cathode and nozzle anode, producing a heated air stream of at least Mach 1 in front of said nozzle.

3. A wind generator as defined by claim 2, in which the arc end of said cathode stick is surrounded by an annular inert gas passage, means for feeding inert gas to such passage to protect such stick cathode arc end from contaminating such arc air stream, and such divergent passage is axially longer than such arc under the influence of such air stream.

4. An arc torch wind tunnel comprising, in combination, a stick cathode composed of refractory metal, a nozzle anode composed of material selected from the class consisting of silver, tungsten, aluminum, and copper, means securing said nozzle anode and stick cathode in fixed spaced relationship with their longitudinal axes in alignment, and means including an annular passage for flowing a protective inert gas stream about the tip of said cathode, a conical passage for receiving and directing such inert gas stream into such nozzle anode and passage means for supplying pressurized air to such conical passage, said nozzle anode having a conical diverging gas outlet passage connected to such conical passage for discharging such inert gas and air therefrom.

5. A wind generator comprising an arc torch provided with an inner electrode and a divergent nozzle-electrode having a gas outlet passage long enough to contain a high-pressure arc energized between said inner electrode and said nozzle electrode as gas for the wind is discharged therefrom at a velocity of between Mach 1 and Mach 20, the length of said passage acting to maintain the useful life of said nozzle electrode, the ratio of outer diameter to minimum inner diameter of said nozzle being at least about 4.

6. A supersonic wind generator comprising an arc torch provided with a nozzle having a divergent type conical orifice for expanding and discharging air at a velocity of at least Mach 1, means for heating and accelerating the flow of air through such orifice comprising electrical circuit means for maintaining a high-pressure arc in air allowing through such orifice, and means for supplying air under pressure to said nozzle, the effect of said divergent-type orifice also being to inhibit erosion of the nozzle as well as contamination of the so-discharged air by keeping such arc therein even under the servere conditions resulting from such operation of the torch, said arc torch being provided with a cathode and an anode for such arc, and means for protecting said cathode from erosion and oxidation in use, comprising means for flowing a stream of inert gas between such cathode and the air flowing through such orifice.

7. A supersonic hot air stream generator comprising a non-transferred arc torch adapted to discharge a high-velocity jet of hot uncontaminated air continuously for at least 10 minutes at Mach 1.6, said torch including a copper nozzle constituting the arc anode having a conical inlet leading a ⅛-inch throat, diverging for about 1 inch to a ³⁄₁₆-inch mouth, a tungsten cathode tip facing said inlet and electrically insulated from said nozdle, a concentric quartz tube disposed in spaced relation around said cathode for discharging an annular stream of argon gas to protect such tip when carrying an arc from oxidation by air, air passage means in said torch for directing air under pressure to such inlet from the outside of said quartz tube, electrical circuit means for maintaining a high-pressure arc of the order of 250 amperes at 160 volts between said cathode tip and said anode nozzle, means for supplying argon at a rate of the order of 30 cubic feet per hour to said quartz tube, and means for supplying air to said inlet at a rate of the order of 300 cubic feet per hour.

8. An arc torch comprising the combination of a stick cathode composed of thoriated tungsten, a cylindrical tube surrounding the arc end of said cathode in spaced concentric relation, means for delivering a protective inert gas to the annular space between said tube and cathode which is discharged from said tube about such end of said cathode to protect such arc end from chemical corrosion and mechanical erosion, a solid copper nozzle having an internal conical gas passage surrounding the end of said tube in spaced concentric relation, means for delivering gas under pressure to said conical passage for flow about such end of said tube, said nozzle having a gas outlet comprising a throat leading to an expansion passage of increasing diameter for the expansion of such gas as it is discharged therefrom, means for striking a high-pressure arc betwen said nozzle and the arc end of said cathode for heating the gas discharged by said nozzle, and means for supplying gas to said gas nozzle at a pressure sufficient to discharge gas therethrough at a minimum Mach of the order of 1.

9. Method of generating a stream of hot reactive gas effluent at a minimum Mach number of the order of 1, which comprises first flowing a stream of shielding gas selected from the class consisting of argon, helium, krypton, neon, hydrogen, nitrogen, xenon, and mixtures thereof at supersonic velocity through a nozzle having a divergent conical orifice that is the anode of a high-pressure arc, the cathode of which is a refractory metal located centrally within such nozzle so that such stream flows in an annular stream between such cathode and anode, then flowing a stream of reactive gas selected from the class consisting of air, $CO_2$, and oxygen, through such nozzle at supersonic velocity, said reactive gas stream being introduced into such nozzle downstream with respect to said cathode so that such annular stream of shielding gas first bathes such cathode to protect the latter from reaction in such reactive stream which merges with such shielding gas, the resulting reactive gas stream being thereupon discharged from said nozzle with a minimum of contamination from the metal of such cathode, as an arc heated gas effluent at a minimum Mach number of the order of 1.

References Cited in the file of this patent

UNITED STATES PATENTS

| 2,806,124 | Gage | Sept. 10, 1957 |
| 2,819,423 | Clark | Jan. 8, 1958 |
| 2,922,869 | Giannini et al. | Jan. 26, 1960 |
| 3,029,635 | Fetz | Apr. 17, 1962 |

OTHER REFERENCES

Publication: Scientific American, August 1957, pages 80–88, "The Plasma Jet" by G. Giannini. (Copy in 73-147.)